United States Patent [19]

Watanabe

[11] 4,217,000

[45] Aug. 12, 1980

[54] CUTTER DEVICE FOR BREAKING AND CRUSHING REINFORCED CONCRETE

[75] Inventor: Matsutaro Watanabe, Ichikawa, Japan

[73] Assignee: Watanabe Kaitai Kogyo K.K., Tokyo, Japan

[21] Appl. No.: 964,673

[22] Filed: Nov. 29, 1978

[30] Foreign Application Priority Data

Jun. 23, 1978 [JP] Japan .................................. 53-76070

[51] Int. Cl.² ............................................. E21C 37/00
[52] U.S. Cl. ..................... 299/67; 125/23 R;
  144/34 E; 241/30; 299/85
[58] Field of Search ....................... 299/36, 37, 67, 69,
  299/70, 85; 125/23 R; 241/30; 225/103, 104;
  144/34 E; 30/92

[56] References Cited

U.S. PATENT DOCUMENTS

| | | | |
|---|---|---|---|
| 2,878,002 | 3/1959 | Haley | 299/36 |
| 3,026,865 | 3/1962 | Sunada | 125/23 R |
| 3,325,927 | 6/1967 | Mullin | 299/36 |
| 3,627,004 | 12/1971 | Ramey | 144/34 E |
| 3,720,359 | 3/1973 | Cox | 225/104 |
| 3,722,114 | 3/1973 | Knell et al. | 299/85 |
| 3,814,152 | 6/1974 | Pallari | 144/34 E X |
| 3,980,341 | 9/1976 | Musannif et al. | 299/36 |
| 4,131,144 | 12/1978 | Fischer | 144/34 E |

*Primary Examiner*—Ernest R. Purser
*Attorney, Agent, or Firm*—Saul Jecies

[57] ABSTRACT

A device for breaking and crushing reinforced concrete and also shearing off steel bars or the like embedded therein or exposed therefrom after concrete has been torn off. The device comprises in general a frame, a cutter assembly or unit and a hydraulic actuator for operating the cutter assembly. The cutter assembly comprises a stationary cutting blade securely attached to the frame and a movable cutting blade pivotably attached to the frame and operatively coupled to the hydraulic actuator so that the movable cutting blade may move toward and away from the stationary cutting blade. The stationary and movable cutting blades clamp concrete and steel bars or the like embedded therein between them and crush concrete and shear off the steel bars or the like simultaneously as the movable cutting blade is forced to move toward the stationary cutting blade. (Both the stationary and movable cutting blades may be formed with jaws integrally thereof so that the jaws may also crush concrete and/or securely clamp it between them while the cutting blades break and crush concrete and/or shear off the steel bars or the like.)

8 Claims, 6 Drawing Figures

CUTTER DEVICE FOR BREAKING AND CRUSHING REINFORCED CONCRETE

BACKGROUND OF THE INVENTION

The present invention relates to generally a cutter device for breaking and crushing reinforced concrete used, for instance, for demolishing or dismantling a reinforced concrete building or the like and more particularly a device for breaking and crushing reinforced concrete while simultaneously shearing off steel bars or the like embedded therein with less vibration and noise yet with higher efficiency hitherto unattainable by any conventional concrete breakers or the like.

So far concrete breakers, impact breakers and steel balls have been used for demolishing concrete buildings. Steel bars or the like exposed after concrete structual members have been crushed have been cut off with gas burners. That is, in demolishing concrete buildings, two types of operators are required, one for operating machines or devices for breaking and crushing concrete structural members such as walls and the other for cutting off the exposed steel bars or the like with gas burners. Since various machines and divices are required, the demolishing operations are very much complex with low efficiency. Individual machines and devices such as concrete breakers and steel ball breakers have low concrete breaking and crushing powers and low efficiency. Furthermore, their operations are inevitably accompanied with greater vibration and noise, causing serious vibration and noise problems in a relatively large area around a field site.

In order to overcome these problems, there has been devised and demonstrated a device of the type for breaking and crushing concrete by exerting the bending moment thereto. This device, however, cannot provide a sufficient concrete breaking and crushing power because, as described above, it causes the fracture of concrete by exerting the bending force thereto. Furthermore, this device cannot cut or shear off the steel bars or the like embedded therein or exposed after the concrete structure has been torn off. Thus, the efficiency is still unsatisfactorily low.

Therefore, the provision of a device capable of accomplishing a dual function of breaking and crushing concrete structual members and cutting or shearing off the steel bars embedded therein simultaneously or after they are exposed out of crushed concrete members with minimum vibration and noise will be advantageous in that concrete buildings or the like may be effectively and efficiently demolished and the working conditions may be considerably improved.

SUMMARY OF THE INVENTION

Accordingly, one of the objects of the present invention is to provide a cutter device capable of not only breaking and crushing concrete but also cutting or shearing off steel bars or the like embedded therein simultaneously.

Another object of the present invention is to provide a cutter device of the type described above which may minimize vibration and noise in demolishing concrete buildings or the like.

The present invention is based upon the underlying principle of exerting the shearing forces to concrete and steel bars or the like embedded therein, thereby breaking and crushing said concrete and simultaneously cutting or shearing off said steel bars or the like.

A further object of the present invention is therefor to provide a novel and improved cutter device for breaking and crushing reinforced concrete comprising a cutter assembly with a cutting blade or unit comprising a first cutter body or a movable cutting blade member one end of which is attached to a frame for pivotal movement and a second cutter body with a cutting blade or a stationary cutting blade member one end of which is securely attached to the frame; and a power unit for actuating the first cutter body or said movable cutting blade member so as to cause it to move toward or away from the second cutter body or said stationary cutting blade member, whereby the first and second cutter bodies or said movable and stationary cutting blade members can clamp reinforced concrete members between them and apply the shearing force thereto, thereby breaking and crushing the concrete members and cutting or shearing off the steel bars or the like embedded therein simultaneously with the concrete breaking and crushing operation or independently thereof after the steel bars or the like have been exposed out of the crushed reinforced members.

The above and other objects, features and advantages of the present invention will become more apparent from the following description of some preferred embodiments thereof taken in conjunction with the accompanying drawings.

DESCRIPTION OF THE PREFERRED EMBODIMENTS

Figure 1:
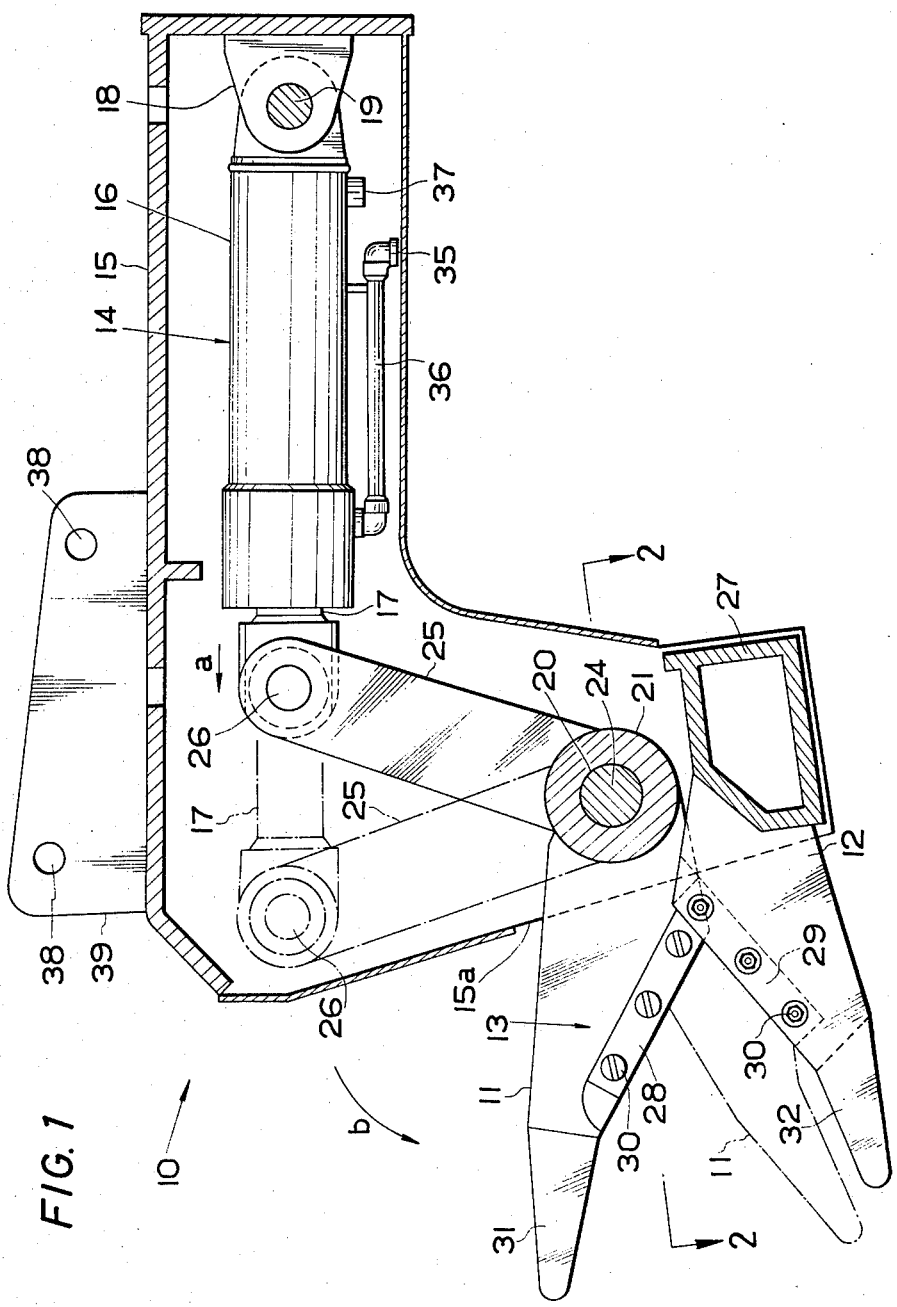
FIG. 1 is a schematic longitudinal sectional side view of a first embodiment of a cutter device for breaking and crushing reinforced concrete (to be referred to as "the concrete cutter device" for brevity hereinafter in this specification) in accordance with the present invention.

Referring to FIG. 1, the concrete cutter device generally designated by the reference numeral 10 comprises, in general, a cutter assembly or unit 13 comprising a first cutter body 11 or a movable cutter blade-jaw member and a second cutter body 12 or a stationary cutter blade-jaw member; a hydraulic actuator or a power cylinder 14 for actuating the cutter assembly or unit 13 or more particularly the movable cutting blade-jaw member 11 as will be described in more detail hereinafter, and a nearly L-shaped casing 15 with an open front end 15a. The hydraulic actuator or the power cylinder 14 is disposed within the casing 15. The first cutter body 11 and the second cutter body 12 or the movable and stationary cutting blade-jaw members 11 and 12 are extended outwardly of the casing 15 through the open front end 15a thereof. The hydraulic actuator 14 or the power cylinder 14 comprises a cylinder 16, a piston (not shown) reciprocably slidably fitted into the cylinder 16 and a piston rod 17 extended from the piston. The base of the hydraulic actuator or the power cylinder 14 is pivotably attached with a pivot pin 19 to a bracket 18 which in turn is securely fixed to the end wall of the casing 15 and disposed within the casing 15.

The first cutter body or the movable cutting blade-jaw member 11 is in the form of an arm and has one end thereof connected to a boss 21 with a shaft insertion hole 20. The boss 21 is rotatably fitted over a shaft 24 which in turn is securely supported between side plates 22a and 22b of the casing 15 and firmly retained in position with retaining means 23. Thus the first cutter body or the movable cutting blade-jaw member 11 is rotatably mounted on the shaft 24. Said one end of the first cutter body 11 or the movable cutting blade-jaw member 11 is connected to a crank arm 25. This crank arm 25 and the first cutter body 11 constitute a nearly L-shaped crank lever. One end of the crank arm 25 is pivoted with a pin 26 to the piston rod 17. Since the first cutter body 11 and the boss 21 and the crank arm 25 are connected together integrally so that they move in unison.

Figure 2:
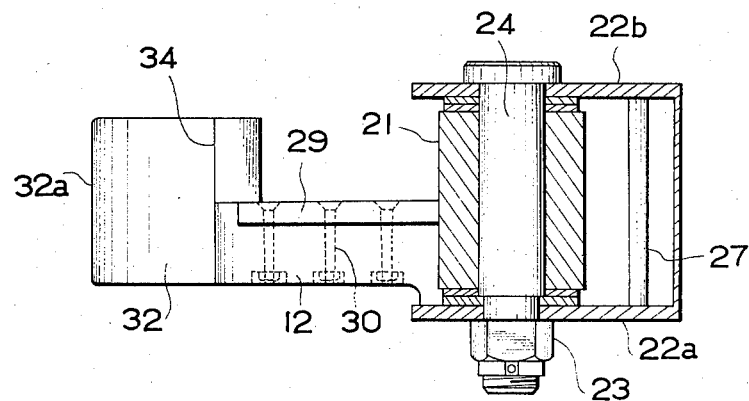
FIG. 2 is a sectional view thereof taken along the line 2—2 of FIG. 1.
Figure 3:
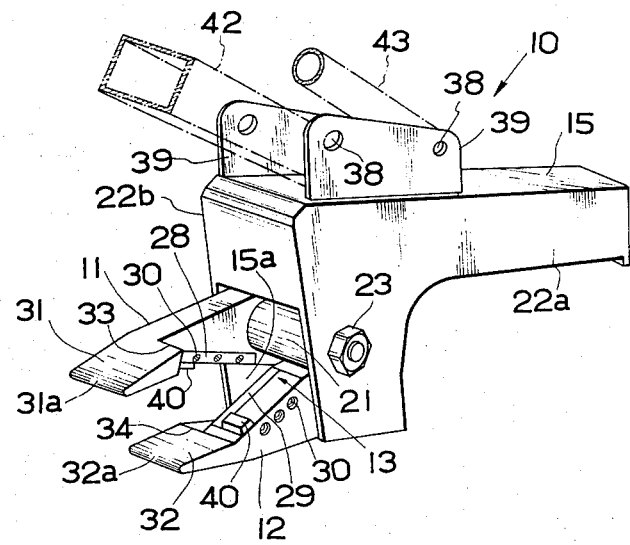
FIG. 3 is a perspective view thereof.

In FIG. 1, the second cutter body 12 or the stationary cutting blade-jaw member 12 is disposed below the first cutter body or the movable cutting blade-jaw member 11. The second cutter body 12 is in the form of an arm as is the first cutter body or the movable cutting blade-jaw member 11. One end of the second cutter body or the stationary cutting blade-jaw member 12 is securely attached to a base 27 disposed within the casing 15. Cutting blades 28 and 29 are securely attached with retaining means 30 to the corner portions at the lower surface of the first cutter body or the movable cutting blade-jaw member 11 and at the upper surface of the second cutter body or the stationary cutting blade-jaw member 12. As shown in FIGS. 2 and 3, the two cutter bodies 11 and 12 have their leading ends formed integral with jaws 31 and 32. Because of the difference in width, stepped portions or shoulders 33 and 34 are formed between the cutter bodies 11 and 12 and the jaws 31 and 32. As shown in FIGS. 2 and 3, the leading edges 31a and 32a of the jaws 31 and 32 are made flat, and as shown in FIG. 1 the jaws 31 and 32 are converging toward their leading edges when viewed from the side.

An oil pipe 36 with an oil inlet and outlet port 35 is connected to one end side of the cylinder 16 of the hydraulic actuator 14. An oil inlet and outlet port 37 is opened at the other end side of the cylinder 16. Oil hoses (not shown) are connected to the oil inlet and outlet ports 35 and 37, and the hydraulic actuator 14 is provided with required piping. A bracket 39 with mounting holes 38 is attached to the upper surface of the casing 15.

Next the mode of operation of the first embodiment with the above construction will be described. When the working oil under pressure is admitted through the second port 37 into the hydraulic device or the power cylinder 14, the piston rod 17 is caused to extend to the left as indicated by the arrow a in FIG. 1. Then the translation of the piston rod 17 is converted into the rotary motion in the direction b of the first cutter body or the movable cutting blade-jaw member 11 about the crankshaft 24. On the other hand, when the piston rod 17 is retracted or moved to the right in FIG. 1, the first cutter body or the movable cutting blade-jaw member 11 is caused to rotate in the clockwise direction. In this case, the axis of the pivot pin 26 at the free end of the piston rod 17 describes an arc so that the hydraulic device or the power cylinder 14 is caused to swing about the pivot pin 19. The first cutter body or the movable cutting blade-jaw member 11 is caused to swing about the crankshaft 24 toward and away from the second cutter body or the stationary cutting blade-jaw member 12 as the piston rod 17 is reciprocated. That is, the concrete cutter assembly or unit 13 is opened and closed so that a concrete member may be clamped between and crushed or broken by the first and second cutter bodies or the movable and stationary cutting blade-jaw members 11 and 12. In like manner, the steel bars embedded in the concrete member is cut or sheared off. In this case, the jaws 31 and 32 may firmly clamp the concrete member while the steel bars or the like are being cut or sheared off. When the upper jaw 31 is further forced toward the stationary jaw 32, the concrete member clamped therebetween is torn off or crushed. The first and second cutter bodies or the movable and stationary cutting blade-jaw members 11 and 12 may be so arranged that when the piston rod 17 is extended to the extreme of its extension, there may be some gap between the movable and stationary jaws 31 and 32. Alternatively, they may be forcibly pressed against each other.

As shown in FIG. 3, the lower surface of the first cutter body or the movable cutter body 11 and the upper surface of the second cutter body or the stationary cutter body 11 may be formed with downwardly and upwardly projected stoppers 40, respectively, so that in addition to the jaws 31 and 32, these stoppers 40 may firmly grip the concrete member or the like while the latter is being torn off or crushed or the steel bar or the like is being cut or sheared off. Alternatively, the stopper 40 may be formed only on the lower surface of the first or movable cutter body 11 or the upper surface of the second or stationary cutter body 12. Furthermore, a number of stoppers formed on either or both of the lower and upper surfaces is not limited.

The concrete cutter device 10 described above may be used as an attachment of a power shovel or a shovel loader as will be described below in conjunction with the demolishment of a reinforced concrete building with particular reference to FIG. 4. The concrete cutter device 10 is attached to the upper end of the boom 42 and the hydraulically operated bucket control lever 43 of a power shovel or a shovel loader 41 with bolts and nuts or any other suitable connection means 44 which are inserted into the mounting holes 38 of the bracket 39 of the concrete cutter device 10. In the building crushing operation, the concrete cutter assembly 13 is first kept closed and is so operated that the leading edges of the clamping jaws 31 and 32 forcibly strike against a concrete wall 45, thereby creating a hole. Thereafter the concrete cutter assembly or unit 13 is opened and the first or movable cutter body 11 or the second or stationary cutter body 12 is inserted into the hole thus formed in such a way that the concrete wall 45 may be clamped between the first or movable and second or stationary cutter bodies 11 and 12. The hydraulic device or the hydraulic power cylinder 14 is so operated that the first or movable cutter-jaw member 11 is forced to move toward the second or stationary cutter body or cutting blade-jaw 12 so that the concrete wall 45 is torn off or crushed.

Figure 4:
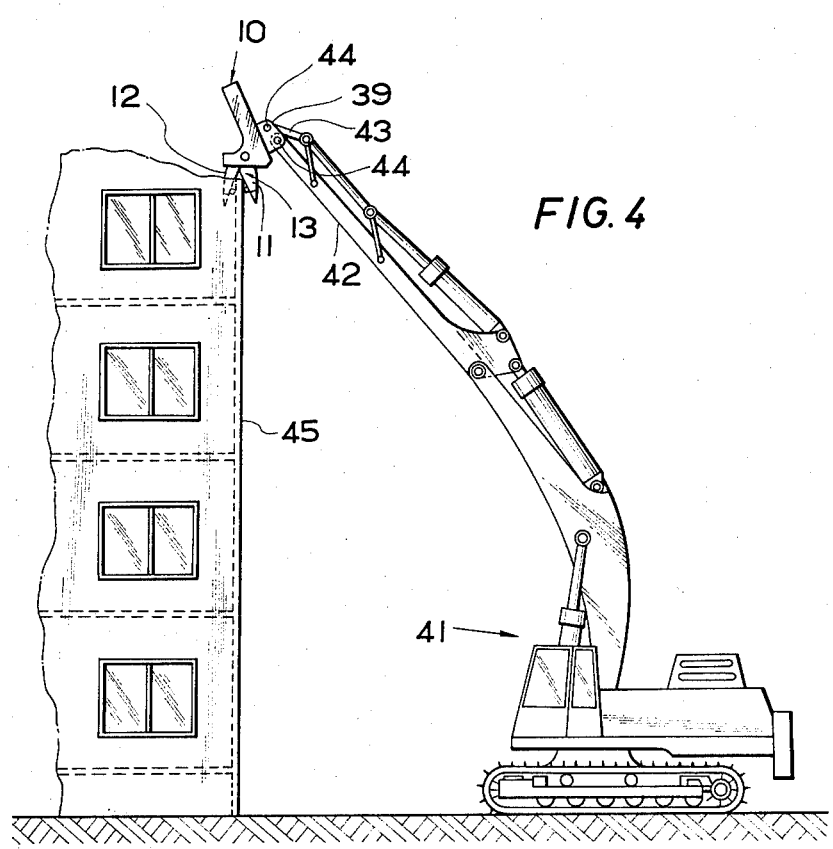
FIG. 4 shows the concrete cutter device attached to the boom of a power shovel and operatively coupled to a hydraulically operated bucket control system so that the concrete cutter may be used for breaking and crushing walls of a concrete building.
Figure 5:
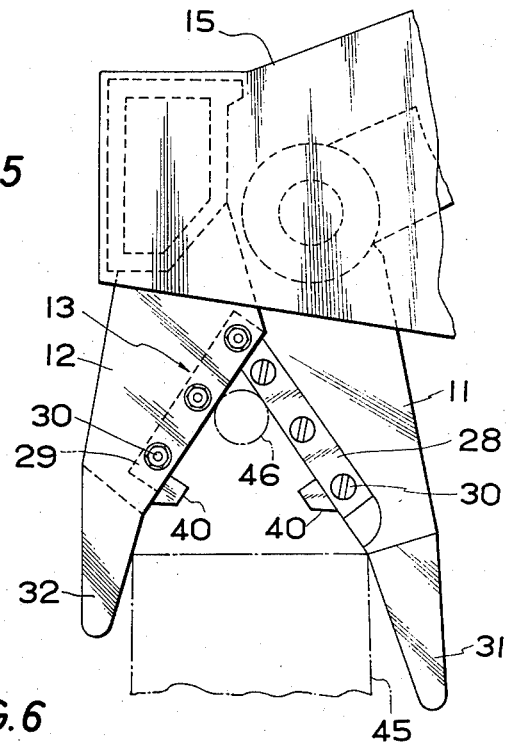
FIG. 5 is a fragmentary side view, partly in section, of the concrete cutter device shown in FIG. 1.

In FIG. 4, the second or stationary cutting blade-jaw member 12 is shown as being inserted into the hole formed through the concrete wall 45 while the first or movable cutting blade-jaw member 11 is shown as clamping the concrete wall 45 from the exterior. When the concrete wall 45 is torn off or crushed in the manner described above, the steel bar or the like 46 (See FIG. 5) is also cut or sheared off by the movable and stationary cutting blades 28 and 29. In this case, as described above, the jaws 31 and 32 and the stoppers 40 serve to firmly grip or clamp the concrete wall 45 and/or the steel bar or the like 46, whereby the slippage between the latter and the cutting blades 28 and 29 may be prevented when the latter are tearing or crushing the concrete wall 45 and cutting or shearing off the steel bar or the like 46.

It is also apparent that the concrete wall 45 clamped between the jaws 31 and 32 can be torn off or crushed as the piston rod 17 is further extended so that the first cutter body or movable cutting blade-jaw member 11 is forced to move more closer toward the second cutter body or stationary cutting blade-jaw member 12. The steel bar or the like 46 exposed after the concrete has been torn off or crushed may be cut or sheared off in the manner described above. When the exposed steel bar or the like 46 has been bent or twisted due to the strong crushing force applied to the concrete wall 45, it may be clamped between the jaws 31 and 32 and extended straight so that it may be easily cut or sheared off by the cutting blades 28 and 29.

The concrete blocks or fragments resulted from the crushing of the concrete wall 45 may be clamped between the clamping jaws 31 and 32 and dumped at a suitable place in a manner substantially similar to that of the bucket operation. At the damping place, the concrete block or the like may be crushed by the jaws 31 and 32 in the manner described above so as to recover the steel bars or the like.

As the building is broken up or demolished in the manner described, the concrete debris and steel scraps are accumulated on the ground so that their dumping is required. In this case, the cutter assembly 13 is closed and is oriented downward with the leading edges 31a and 32a made into contact with the ground. As the closed cutter-jaw assembly 13 is operated just like a dragline bucket, the concrete debris and steel scraps may be collected and hauled toward the dumping points.

As described above, the demolishment of a concrete building involves the tearing off or crushing of concrete structual members such as walls, ceilings, floors and so on, cutting or shearing off of embedded and exposed steel bars or the like, further tearing off or crushing large concrete debris into small pieces, removal of concrete still attached to the steel bars or the like, and the recovery of the steel bars or the like thus cut or sheared off. It is readily seen from the above explanation that these operations may be readily accomplished with the concrete cutter device in accordance with the present invention. In other words, the concrete cutter device 10 in accordance with the present invention can completely eliminate the tearing off or crushing the concrete structural members with the conventional concrete breakers or the like, the cutting off with gas burners of the exposed steel bars or the like, the dumping of large torn off concrete blocks, further crushing of concrete blocks into small pieces with concrete breakers and cumbersome and tedious operation of removing concrete attached to the steel bars or the like. Thus various devices hitherto used for breaking down concrete buildings or the like may be eliminated. Furthermore, the efficiency may be remarkably improved and the cost may be considerably reduced. In addition, the concrete cutter device 10 of the present invention may be used as the attachment of the power shovel or the shovel loader as described above, a large power of the latter may be advantageously and readily used for driving the concrete cutter device 10. Thus, any concrete building or the like may be rapidly broken down in a simple manner.

Figure 6:
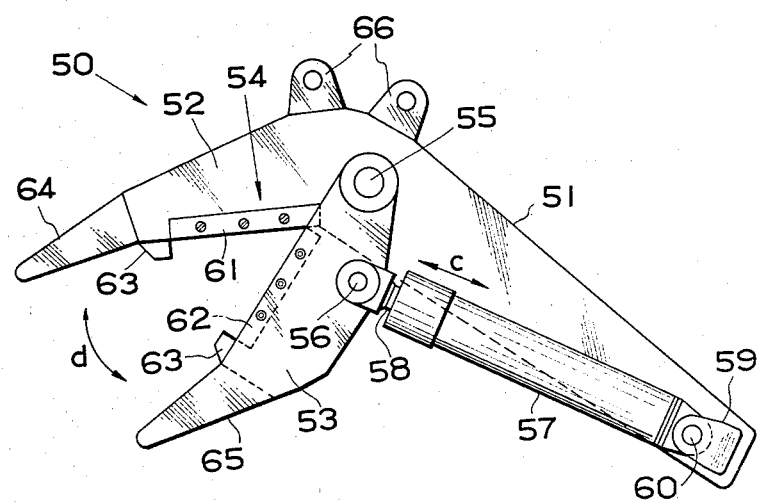
FIG. 6 is a schematic side view of a second embodiment of the present invention.

Next referring to FIG. 6, the second embodiment of the present invention will be described. The concrete cutter device generally indicated by the reference numeral 50 includes a main body 51 having a stationary or second cutting blade-jaw member 52 formed integral therewith. The stationary or second cutter blade-jaw member 52 has a cutting blade 61 and a clamping jaw 64 as with the first embodiment. A first or movable cutter blade-jaw member 53 has a cutting blade 62 and a jaw 65 which mate with the corresponding cutting blade 61 and the jaw 64 of the second or stationary cutting blade-jaw member 52 as with the first embodiment. One end remote from the jaw 65 of the first or movable cutting blade-jaw member 53 is pivoted with a pin 55 to the main body 51 at a point between the ends thereof. The base of a hydraulic device or a power piston 57 is pivoted with a pin 60 to a bracket 59 which in turn is securely attached to the end remote from the jaw 64 of the main body 51. The free end of a piston rod 58 of the hydraulic device or the power cylinder 57 is pivoted with a pin 56 to the first or movable cutting blade-jaw member 53 at a point between the ends thereof so that as the piston rod 58 is reciprocated or extended and retracted in the directions indicated by the double-pointed arrow c, the first or movable cutting blade-jaw member 53 is caused to swing about the pivot point 55 on the main body 51 in the clockwise and counterclockwise directions indicated by the double-pointed arrow d toward and away from the second or stationary cutting blade-jaw member 52. The movable and stationary cutting blade-jaw members 53 and 52 constitute a concrete cutter assembly or unit 54.

The main body 51 is formed with two brackets 66 with holes so that the concrete cutter device 50 may be operatively attached to the power shovel or the shovel loader in the manner described above.

The mode of operation of the second embodiment with the above construction is substantially similar to that of the first embodiment. That is, when the piston rod 58 is extended and retracted, the movable cutting blade-jaw member 53 is caused to move toward and away from the stationary cutting blade-jaw member 52 as described above so that a reinforced concrete structual member may be clamped and torn off or crushed between the cutting blades 61 and 62 and between the jaws 64 and 65. The steel bars or the like embedded in the concrete structual member may be cut or sheared off by the cutting blades 61 and 62. In this case, stoppers 63 serve to securely hold or grip the concrete structual member as with the first embodiment.

When the concrete cutter device 50 is attached to the boom of a shovel loader or a power shovel, it may also accomplish various works involved in the breaking down of a concrete building or the like in a manner substantially similar to that described above with reference to FIG. 4.

It is to be understood that the present invention is not limited to the embodiments described above and that various modifications may be effected without departing the true spirit of the present invention. For instance, the concrete cutter device in accordance with the present invention may be also equally used for demolishing a high-story reinforced concrete structure which cannot be reached by a shovel loader or a power shovel. In this case, the concrete cutter device 10 or 50 of the present invention may be suspended from wires from a crane, and the hydraulic device or the power cylinder 14 or 57 may be operatively connected through long hoses or the like with a hydraulic operating and control system on the ground. In like manner, the cutter device 10 or 50 may be used for breaking down an underground structure.

Furthermore the concrete cutter device 10 or 50 may be used as an attachment to any suitable machines or devices in addition to the power shovel or shovel loader described above. Instead of breaking reinforced concrete structual members, the concrete cutter 10 or 50 may be equally used for breaking and tearing off or crushing concrete or the like and steel or the like embedded therein or exposed therefrom. Furthermore the concrete cutter 10 or 50 may be used for only breaking and tearing off or crushing concrete or steel bars or the like only. It may cut or shear off not only solid steel bars or the like but also hollow ones.

The concrete cutter device of the present invention has a considerably high concrete breaking and crushing power so that it can easily break and crush any concrete members with or without reinforcing steel bars or the like because it is provided with the concrete cutting blades which may effectively impart the shearing force to the concrete members. In general, a concrete member is subjected to breakdown with the shearing force of the order of 1/7 to 1/8 of the compressive force with which the cracking and resulting breakdown occurs. This means that a concrete member may be broken or torn off more easily when the shearing force is exerted thereto than when the compression force is applied. Thus, a concrete member may be broken and torn off with a less power. Furthermore, with the concrete cutter device in accordance with the present invention, the concrete breaking and crushing operation accompanies less vibration and noise because it exerts no impact force on a concrete member to be broken.

The novel features and advantages of the present invention will become more apparent from the following results of the comparison between the concrete cutter device of the present invention and a conventional concrete breaker of the type breaking a concrete structual member by exerting the bending moment thereto. Both the devices were used for breaking down a five-story apartment house of reinforced concrete and attached to a shovel loader. The rated output of the engine of the shovel loader used in the experiments was 95 PS/2000 rpm. The maximum rated pressure of the hydraulic device or the power piston was 280 kg/cm$^2$ and the discharge of a hydraulic pump used was 150×2 l/min. The concrete cutter of the present invention was about 1.5 tons.

When the concrete cutter device of the present invention was used, vibration and noise were by far less than when the conventional concrete breaker was used. The concrete cutter device of the present invention exhibited the concrete breaking and crushing capacity about four times as higher as the conventional concrete breaker. Since the concrete cutter device of the present invention can cut or shear off the steel bars or the like while breaking and crushing the concrete structual member into which they are embedded, it is uncomparably higher in efficiency than any conventional concrete breakers. Furthermore because of the high concrete breaking and crushing power and the high efficiency, the cost required for breaking down the concrete apartment was about 1/6 as compared with the conventional concrete breaker.

In summary, with the concrete cutter device of the present invention, vibration and noise may be minimized so that no serious vibration and noise problem will arise and consequently it is very advantageous in use in the urban areas. Since the concrete breaking and crushing power is extremely high and because the steel bars or the like embedded in the concrete structual members are cut or sheared off simultaneously the concrete members are broken and torn off, the high efficiency and great economy in cost may be attained.

What is claimed is:

1. A device for breaking and crushing reinforced concrete, comprising
    a cutter assembly including a first cutter body and a second cutter body each having a leading end and a trailing end, said leading ends each being provided with jaws for clamping and/or crushing the concrete, said second cutter body also having a cutting blade coacting with said jaws;
    a shaft mounting said first cutter body for pivoting movement relative to said second cutter body;
    a crank arm on said first cutter body; and
    a hydraulic actuator including a piston rod connected to said crank arm, for pivoting said first cutter body relative to said second cutter body to and from a closed position of said cutter assembly.

2. A cutter device as set forth in claim 1 wherein the leading edge of each of said jaws is flat; and
    the side surface of each of said jaws is such that the upper and lower surfaces of said jaw converge toward said flat leading edge,
    whereby said flat leading edges of said jaws may sweep and collect the concrete debris and scraps of said reinforcing steel.

3. A cutter device for breaking and crushing reinforced concrete as set forth in claim 1 wherein
    either or both of said first and second cutter bodies are formed with projected stoppers for retaining an object to be sheared off at a predetermined position relative to said cutter assembly or unit.

4. A cutter device for breaking and crushing reinforced concrete as set forth in claim 3 wherein
    said cutter device is provided with bracket means with which said cutter device may be connected to a power shovel or a shovel loader so as to be used as an attachment thereof.

5. A device for breaking and crushing reinforced concrete, comprising
    support means;
    a cutter assembly on said support means and including a stationary cutter arm having a cutting blade, a substantially L-shaped movable cutter arm including a first section also having a cutting blade and means mounting said movable arm intermediate said first and a second section thereof for pivoting movement relative to said stationary arm about a pivot axis; and
    actuating means on said support means for pivoting said movable cutter arm including a cylinder-and-piston unit having a piston rod reciprocable in direction normal to said pivot axis and substantially parallel to the elongation of said stationary arm, said piston rod being articulated to said second section so that translatory movement of said piston rod is converted into pivoting movement of said movable cutter arm.

6. A device as set forth in claim 5, wherein said mounting means comprise a shaft.

7. A device as set forth in claim 5, said support means comprising a substantially L-shaped housing in which said cutter arms are mounted, said housing having an open front side from which said arms project outwardly of said housing.

8. A device as set forth in claim 7, wherein said stationary arm is integral with said housing.

* * * * *